(12) United States Patent
Cao et al.

(10) Patent No.: US 9,001,445 B1
(45) Date of Patent: Apr. 7, 2015

(54) MULTIPLE SYNC MARK STORAGE SYSTEM

(71) Applicant: LSI Corporation, San Jose, CA (US)

(72) Inventors: Rui Cao, Milpitas, CA (US); Haitao Xia, San Jose, CA (US); Lu Lu, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/106,537

(22) Filed: Dec. 13, 2013

Related U.S. Application Data

(60) Provisional application No. 61/913,488, filed on Dec. 9, 2013.

(51) Int. Cl.
  *G11B 5/09* (2006.01)
  *G11B 5/596* (2006.01)
  *G11B 20/10* (2006.01)

(52) U.S. Cl.
  CPC ...... *G11B 5/59655* (2013.01); *G11B 20/10037* (2013.01); *G11B 20/10222* (2013.01)

(58) Field of Classification Search
  None
  See application file for complete search history.

(56) References Cited

U.S. PATENT DOCUMENTS

| 7,929,238 | B1 | 4/2011 | Vasquez |
| 2007/0019316 | A1* | 1/2007 | Norton, Jr. ............... 360/29 |
| 2011/0157737 | A1 | 6/2011 | Grundvig et al. |
| 2012/0106607 | A1 | 5/2012 | Miladinovic et al. |
| 2012/0124241 | A1 | 5/2012 | Yang et al. |

OTHER PUBLICATIONS

U.S. Appl. No. 14/055,886, Unpublished, filed Oct. 17, 2013, Xiufeng Song.
U.S. Appl. No. 13/886,049, Unpublished, filed May 2, 2013, Xun Zhang.
U.S. Appl. No. 13/777,937, Unpublished, filed Feb. 26, 2013, Rui Cao.
U.S. Appl. No. 13/773,886, Unpublished, filed Feb. 22, 2013, Dahua Qin.
U.S. Appl. No. 13/491,135, Unpublished, filed Jun. 7, 2012, Xun Zhang.
U.S. Appl. No. 13/490,913, Unpublished, filed Jun. 7, 2012, Xun Zhang.

* cited by examiner

*Primary Examiner* — Muhammad N Edun
(74) *Attorney, Agent, or Firm* — Hamilton DeSanctis & Cha

(57) ABSTRACT

A data processing system includes a number of analog to digital converters operable to sample analog signals obtained from a magnetic storage medium to yield digital signals, multiple sync mark detectors operable to search for a number of different sync marks in the digital signals, and a sync mark detector output comparator operable to compare an output of each of the sync mark detectors to identify detection errors.

20 Claims, 3 Drawing Sheets

MULTIPLE SYNC MARK STORAGE SYSTEM

CROSS REFERENCE TO RELATED APPLICATIONS

The present application claims priority to (is a non-provisional of) U.S. Pat. App. No. 61/913,488, entitled "Multiple Sync Mark Storage System", and filed Dec. 9, 2013 by Cao et al, the entirety of which is incorporated herein by reference for all purposes.

FIELD OF THE INVENTION

Various embodiments of the present invention provide systems and methods for locating the position of the start of user data in each sector in each track, and more particularly to a storage system with multiple alternating sync mark patterns that can be used to estimate the offtrack position of the read head.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned again over the track as the storage medium is rotated. In this position, the previously stored magnetic flux pattern induces a current in the head assembly that can be converted to the previously recorded digital data. The location of the start of user data is detected using a sync mark stored on the storage medium.

SUMMARY

Various embodiments of the present invention provide systems, apparatuses and methods for locating the position of the start of user data in each sector in each track using multiple alternating sync mark patterns, and for estimating offtrack read head position and/or identifying sector format.

In some embodiments, a data processing system includes a number of analog to digital converters operable to sample analog signals obtained from a magnetic storage medium to yield digital signals, multiple sync mark detectors operable to search for a number of different sync marks in the digital signals, and a sync mark detector output comparator operable to compare an output of each of the sync mark detectors to identify detection errors.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

In the sync mark system disclosed herein for two dimensional magnetic recording, a pair of different sync marks are included to reduce the likelihood of false detection of sync marks in neighboring data tracks, and for use in one or more additional tasks. In some embodiments, the dual sync marks are also used to detect the position of the read head with respect to the center of the target track (or offtrack position). In some embodiments with multiple data sector formats, such as short and long sectors, the dual sync marks are used to identify sector format. In some embodiments, the dual sync marks are used to detect inverted polarity in the read data. In some embodiments, the dual sync marks are used to differentiate user data from flawscan fragments on the hard drive, so that a read channel circuit can be disabled or turned off when the read head is over a flawscan fragment to save power.

The dual sync mark system disclosed herein can be used in a two dimensional magnetic recording system, in which multiple readers are provided on a read/write head assembly. In embodiments with relatively narrow track width, there can be significant interference from neighboring tracks while reading a target track. The dual sync marks are used in alternating data tracks, so the sync marks that are sought while reading a target track are different than those in the neighboring tracks. The dual sync marks are orthogonal or substantially orthogonal selected patterns or sequences with high auto-correlation values, so that a sync mark detector will readily detect the sync mark in the target track. The sync marks also have low cross-correlation values, so that when the sync mark detector is searching for a particular sync mark in the target track, the likelihood of false detection of another sync mark in a neighboring track is reduced or eliminated.

Figure 1:
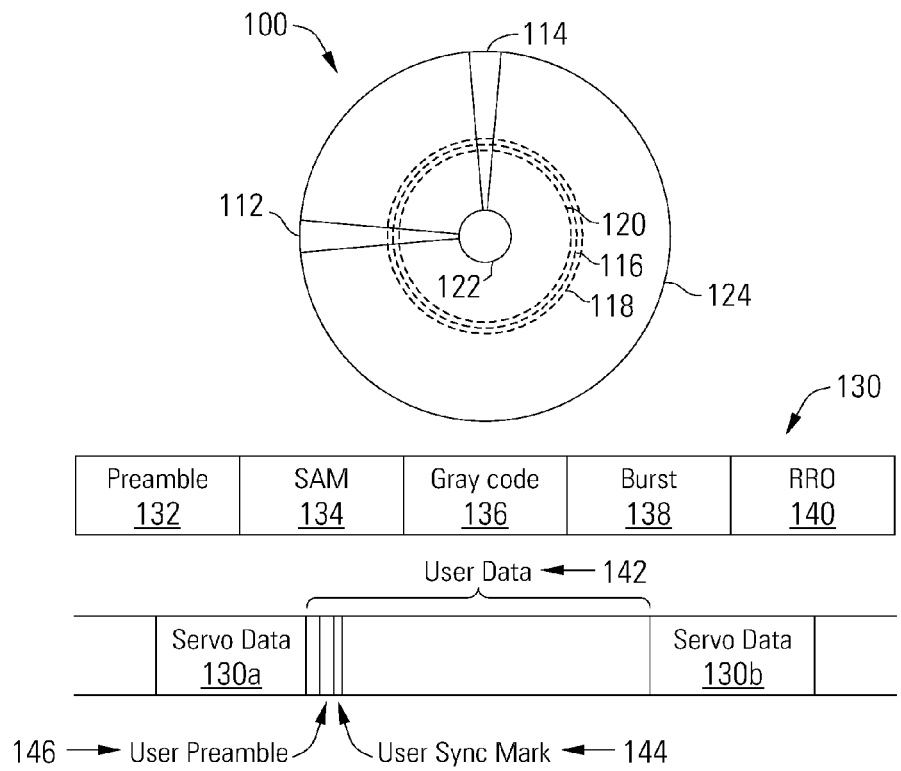
FIG. 1 is a diagram of a magnetic storage medium and sector data scheme that may be used with multiple alternating sync marks in accordance with some embodiments of the present invention.

Turning to FIG. 1, a magnetic storage medium 100 is shown with an example data track 116 and its two adjacent neighboring data tracks 118, 120, indicated as dashed lines. The tracks 116, 118, 120 are segregated by servo data written within servo wedges 112, 114. It should be noted that while three tracks 116, 118, 120 and two servo wedges 112, 114 are shown, hundreds of wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes a preamble pattern 132 followed by a servo address mark 134, a Gray code 136, a burst field 138, and a repeatable run-out (RRO) field 140. In some embodiments, a servo data set has two or more fields of burst information. It should be noted that different information can be included in the servo fields. Between the servo data bit patterns 130a and 130b, a user data region 142 is provided. User data region 142 can include one or more sets of data that are stored on storage medium 100. The data sets can include user synchronization information, some of which can be used as a mark to establish a point of reference from which processing of the data within user data region 142 may begin.

In operation, storage medium 100 is rotated in relation to a sensor that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. In a write operation, the sensor would sense servo data from wedge 112 then write data to the user data region between wedge 112 and wedge 114, with location information in the user data region provided by a user sync mark 144 and a user preamble 146.

As used herein, the phrase "sync mark" is used in its broadest sense to mean any pattern that may be used to establish a point of reference. Thus, for example, the different alternating sync mark patterns disclosed herein are used in some embodiments as user sync marks 144 as are known in the art, or for one or more portions of servo data bit patterns 130. Based upon the disclosure provided herein, one of ordinary skill in the art may recognize other sync marks that could be used in relation to different embodiments of the present invention.

Figure 2:
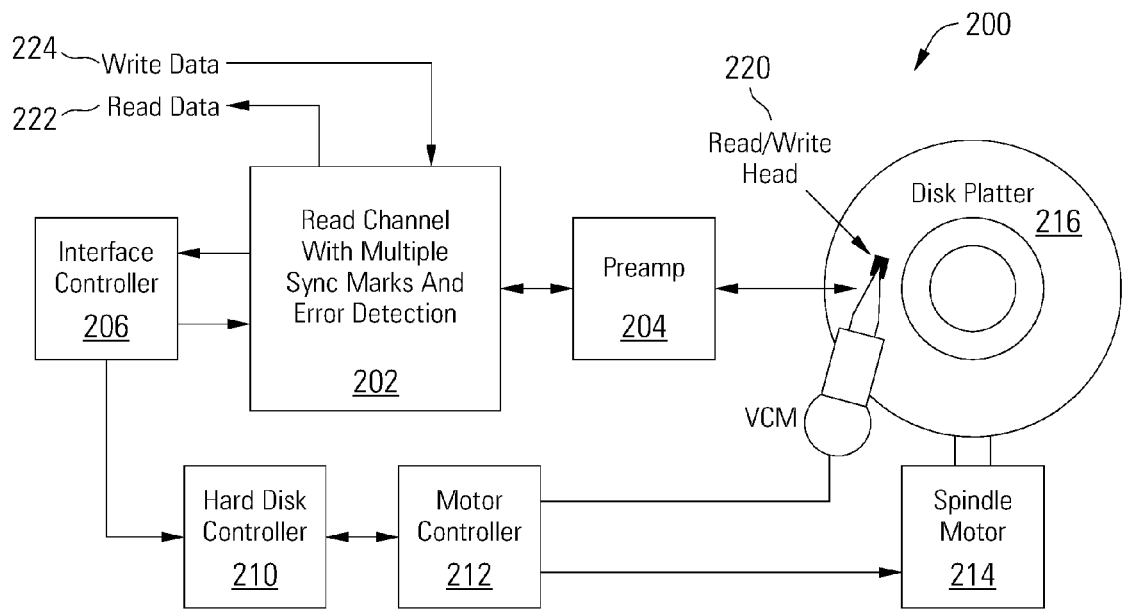
FIG. 2 depicts a storage system including a read channel with a sync mark detector for detecting different sync marks on alternating data tracks in accordance with some embodiments of the present invention.

Turning to FIG. 2, a storage system 200 is disclosed which includes a read channel circuit 202 with a sync mark detector which detects multiple different sync marks on alternating tracks and which detects sync mark detector errors in accordance with some embodiments of the present invention. Storage system 200 may be, for example, a hard disk drive. Storage system 200 also includes a preamplifier 204, an interface controller 206, a hard disk controller 210, a motor controller 212, a spindle motor 214, a disk platter 216, and a read/write head assembly 220. Interface controller 206 controls addressing and timing of data to/from disk platter 216. The data on disk platter 216 consists of groups of magnetic signals that may be detected by read/write head assembly 220 when the assembly is properly positioned over disk platter 216. In one embodiment, disk platter 216 includes magnetic signals recorded in accordance with either a longitudinal or a perpendicular recording scheme.

In a typical read operation, read/write head assembly 220 is accurately positioned by motor controller 212 over a desired data track on disk platter 216. Motor controller 212 both positions read/write head assembly 220 in relation to disk platter 216 and drives spindle motor 214 by moving read/write head assembly 220 to the proper data track on disk platter 216 under the direction of hard disk controller 210. Spindle motor 214 spins disk platter 216 at a determined spin rate (RPMs). Once read/write head assembly 220 is positioned adjacent the proper data track, magnetic signals representing data on disk platter 216 are sensed by read/write head assembly 220 as disk platter 216 is rotated by spindle motor 214. The sensed magnetic signals are provided as a continuous, minute analog signal representative of the magnetic data on disk platter 216. This minute analog signal is transferred from read/write head assembly 220 to read channel circuit 202 via preamplifier 204. Preamplifier 204 is operable to amplify the minute analog signals accessed from disk platter 216. In turn, read channel circuit 202 digitizes and decodes the received analog signal to recreate the information originally written to disk platter 216. This data is provided as read data 222 to a receiving circuit. A write operation is substantially the opposite of the preceding read operation with write data 224 being provided to read channel circuit 202. This data is then encoded and written to disk platter 216. During read operations, read channel circuit 202 searches for a sync mark to locate the position of the start of user data. Different sync marks are written to alternating data tracks, reducing the likelihood of erroneously detecting a sync mark in a neighboring track when searching for a sync mark in a target track.

The multiple sync mark storage system is operable to detect target track sync marks with a reduced likelihood of erroneously detecting different sync marks in neighboring tracks. The outputs of multiple single sync mark detectors are compared to determine whether errors occurred in the single sync mark detection. The result can also be used to detect offtrack position, identify sector format, detect inverted polarity in the read data, and to identify flawscan fragments.

It should be noted that in some embodiments storage system 200 is integrated into a larger storage system such as, for example, a RAID (redundant array of inexpensive disks or redundant array of independent disks) based storage system. Such a RAID storage system increases stability and reliability through redundancy, combining multiple disks as a logical unit. Data can be spread across a number of disks included in the RAID storage system according to a variety of algorithms and accessed by an operating system as if it were a single disk. For example, data can be mirrored to multiple disks in the RAID storage system, or can be sliced and distributed across multiple disks in a number of techniques. If a small number of disks in the RAID storage system fail or become unavailable, error correction techniques can be used to recreate the missing data based on the remaining portions of the data from the other disks in the RAID storage system. The disks in the RAID storage system can be, but are not limited to, individual storage systems such storage system 200, and can be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that in some embodiments storage system 200 is modified to include solid state memory that is used to store data in addition to the storage offered by disk platter 216. This solid state memory may be used in parallel to disk platter 216 to provide additional storage. In such a case, the solid state memory receives and provides information directly to read channel circuit 202. Alternatively, the solid state memory may be used as a cache where it offers faster access time than that offered by disk platter 216. In such a case, the solid state memory may be disposed between interface controller 206 and read channel circuit 202 where it operates as a pass through to disk platter 216 when requested data is not available in the solid state memory or when the solid state memory does not have sufficient storage to hold a newly written data set. Based upon the disclosure provided herein, one of ordinary skill in the art will recognize a variety of storage systems including both disk platter 216 and a solid state memory.

Figure 3:
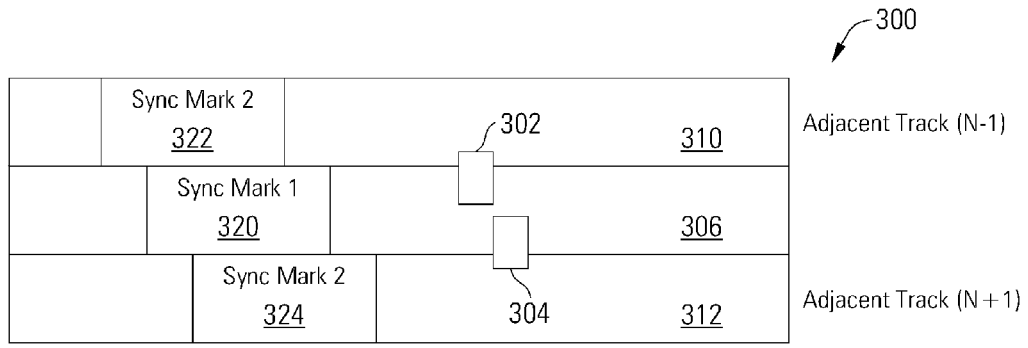
FIG. 3 depicts dual read heads positioned to read a center track between two side tracks in a two dimensional magnetic recording system in accordance with some embodiments of the present invention.

Turning to FIG. 3, dual read heads 302, 304 are shown as they could be positioned to read a center track 306 in a two dimensional magnetic recording system 300 in accordance with some embodiments of the present invention. In this embodiment, the dual read heads 302, 304 are both positioned to read the center track 306 (or target track). Because of the width of the data tracks 306, 310, 312 and the size and position of the dual read heads 302, 304, the data signals from each of the read heads 302, 304 can have a significant interference component from adjacent data tracks 310, 312.

Notably, the sectors in neighboring data tracks 306, 310, 312 are not necessarily aligned. As shown in FIG. 3, the sync marks 320, 322, 324 can be offset by any amount. Thus, when the read heads 302, 304 are positioned over the sync mark 320 in the center track 306, the signal from the read heads 302, 304 may include adjacent track interference from sync marks (e.g., 322, 324) in adjacent data tracks 310, 312. To prevent false detection of sync marks (e.g., 322, 324) in adjacent data tracks 310, 312, different sync marks are written in alternating data tracks. Thus, in some embodiments, the sync mark 320 in the center data track 306 has a first bit pattern, and the sync marks 322, 324 in adjacent data tracks 310, 312 have a second bit pattern. The different sync marks are orthogonal or substantially orthogonal, resulting in a relatively small cross-correlation between sync marks on adjacent data tracks. In some embodiments, the sync marks to be used are determined using an exhaustive search in a search engine comparing possible sync patterns with the preambles that will precede the sync marks on the storage medium, and with shifted versions of the sync patterns being considered, to identify sync pattern candidates that have a relatively high auto-correlation allowing them to be detected, and relatively low cross-correlation with the preamble and shifted versions of the sync pattern to prevent false detection. The search engine calculates Euclidean distances to perform the comparisons, yielding sync pattern candidates with the lowest Euclidean distances to themselves for a high auto-correlation, and then calculates the Euclidean distances between the sync pattern candidates to identify those with the highest Euclidean distances between each other, yielding orthogonal or substantially orthogonal sync patterns to use on alternating data tracks.

Figure 4:
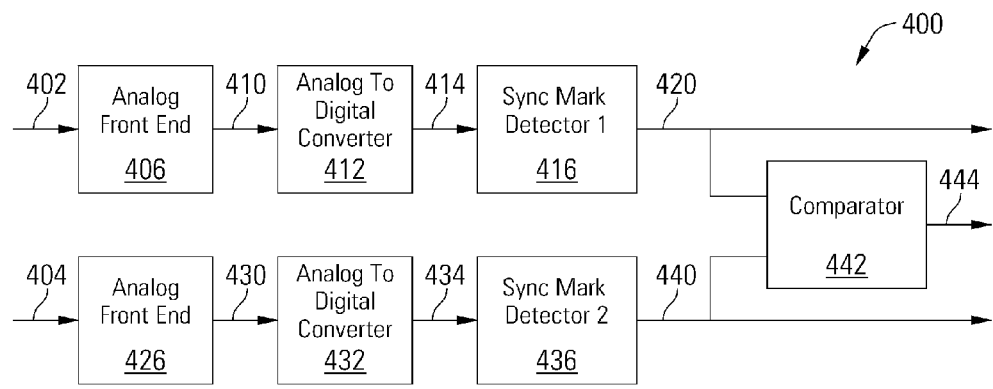
FIG. 4 depicts a data processing circuit with sync mark detectors for dual sync marks and with a sync mark detected comparator in accordance with some embodiments of the present invention.

Turning to FIG. 4, a data processing circuit 400 is shown in accordance with some embodiments of the present invention. A pair of analog signals 402, 404 receive analog signals read from a data track by dual read sensors. When the dual read sensors pass over a stored sync mark on the storage medium, the analog signals 402, 404 carry information representing the stored sync mark. When a stored sync mark is in the adjacent data tracks, the dual read sensors can also include information based on the sync mark in the adjacent data track. However, because orthogonal sync marks are stored in alternating data tracks, false detection of the sync marks in the adjacent data track(s) is prevented.

From the first read sensor, a first analog front end circuit 406 receives the analog signal 402 read from the data track. Analog front end circuit 406 processes analog signal 402 and provides a processed analog signal 410 to an analog to digital converter circuit 412. Analog front end circuit 412 can include, but is not limited to, a DC compensation circuit, an analog filter and an amplifier circuit as are known in the art. Based upon the disclosure provided herein, one of ordinary skill in the art will recognize a variety of circuitry that may be included as part of analog front end circuit 406. In some cases, analog input signal 402 is derived from a read/write head assembly (e.g., 220) that is disposed in relation to a storage medium (e.g., 216). Based upon the disclosure provided herein, one of ordinary skill in the art will recognize a variety of sources from which analog signal 402 may be derived.

Analog to digital converter circuit 412 converts processed analog signal 410 into a corresponding series of digital samples 414. Analog to digital converter circuit 412 can be any circuit known in the art that is capable of producing digital samples corresponding to an analog input signal. Based upon the disclosure provided herein, one of ordinary skill in the art will recognize a variety of analog to digital converter circuits that can be used in relation to different embodiments of the present invention.

Digital samples 414 are provided to a first sync mark detector 416. Sync mark detector 416 compares digital samples 414 as they are received with a first of the sync mark patterns. The algorithm applied by sync mark detector 416 to correlate the digital samples 414 with the first sync mark pattern can be any suitable correlation algorithm, such as, but not limited to, direct correlation, block correlation, norm-distance based approaches, etc. Based upon the disclosure provided herein, one of ordinary skill in the art will recognize a variety of correlation algorithms that could be used by sync mark detector 416 in relation to different embodiments of the present invention. In some embodiments, the sync mark detector 416 calculates the Euclidean distance between the digital samples 414 and the sync mark pattern and compares the Euclidean distance with a threshold. If the Euclidean distance is less than a threshold, the sync mark detector 416 asserts a sync mark detected output 420, indicating that the first sync mark was detected. In some embodiments, the threshold is selected to be smaller than half the Euclidean distance between the two sync mark patterns in order to reduce the likelihood of erroneously detecting the second sync mark when the target data track contains the first sync mark but the read sensor producing analog input signal 402 picks up the second sync mark from an adjacent data track.

From the second read sensor, a second analog front end circuit 426 receives the analog signal 404 read from the data track. Analog front end circuit 426 processes analog signal 404 and provides a processed analog signal 430 to an analog to digital converter circuit 432. Analog front end circuit 432 can include, but is not limited to, a DC compensation circuit, an analog filter and an amplifier circuit as are known in the art. Based upon the disclosure provided herein, one of ordinary skill in the art will recognize a variety of circuitry that may be included as part of analog front end circuit 426. In some cases, analog input signal 404 is derived from a read/write head assembly (e.g., 220) that is disposed in relation to a storage medium (e.g., 216). Based upon the disclosure provided herein, one of ordinary skill in the art will recognize a variety of sources from which analog signal 404 may be derived.

Analog to digital converter circuit 432 converts processed analog signal 430 into a corresponding series of digital samples 434. Analog to digital converter circuit 432 can be any circuit known in the art that is capable of producing digital samples corresponding to an analog input signal. Based upon the disclosure provided herein, one of ordinary skill in the art will recognize a variety of analog to digital converter circuits that can be used in relation to different embodiments of the present invention.

Digital samples 434 are provided to a second sync mark detector 436. Sync mark detector 436 compares digital samples 434 as they are received with a second of the sync mark patterns. The algorithm applied by sync mark detector 436 to correlate the digital samples 434 with the second sync mark pattern can be any suitable correlation algorithm, such as, but not limited to, direct correlation, block correlation, norm-distance based approaches, etc. Based upon the disclosure provided herein, one of ordinary skill in the art will recognize a variety of correlation algorithms that could be used by sync mark detector 436 in relation to different embodiments of the present invention. In some embodiments, the sync mark detector 436 calculates the Euclidean distance between the digital samples 434 and the second sync mark pattern and compares the Euclidean distance with a threshold. If the Euclidean distance is less than a threshold, the sync mark detector 436 asserts a second sync mark detected output 440, indicating that the second sync mark was detected. In some embodiments, the threshold is selected to be smaller than half the Euclidean distance between the two sync mark patterns in order to reduce the likelihood of erroneously detecting the first sync mark when the target data track contains the second sync mark but the read sensor producing analog input signal 404 picks up the first sync mark from an adjacent data track.

Thus, depending on whether the first or second sync mark patterns are used in the target data track, either the first sync mark detected output 420 or the second sync mark detected output 440 should be asserted. A sync mark detector output comparator 442 analyzes the first sync mark detected output 420 and the second sync mark detected output 440 to identify sync detection errors. When the first sync mark detected output 420 is asserted and the second sync mark detected output 440 is not asserted, the sync mark detector output comparator 442 indicates at output 444 that the first sync mark was successfully detected. When the first sync mark detected output 420 is not asserted and the second sync mark detected output 440 is asserted, the sync mark detector output comparator 442 indicates that the second sync mark was successfully detected. If the first sync mark detected output 420 and the second sync mark detected output 440 are both asserted, the sync mark detector output comparator 442 indicates that an error has occurred and the indicated sync mark detections are not valid. When neither the first sync mark detected output 420 nor the second sync mark detected output 440 are asserted, the sync mark detector output comparator 442 indicates that no sync mark has been detected. In some embodiments, the sync mark detector output comparator 442 includes an XOR circuit to compare the first sync mark detected output 420 and the second sync mark detected output 440. Based upon the disclosure provided herein, one of ordinary skill in the art will recognize a variety of comparison circuits that can be used in sync mark detector output comparator 442 in relation to different embodiments of the present invention.

In some embodiments, more than two sync mark patterns can be used, with each data track having a different one of the sync mark patterns than its adjacent data tracks, by including more than two sync mark detectors and adapting the sync mark detector output comparator to consider more than two inputs, ensuring that only one of the sync mark patterns is detected in the target track.

Other processing elements can be included in the sync mark detection path, such as, but not limited to, an equalizer to filter and shape the digital samples. In such an embodiment with an equalizer, the sync mark patterns sought by the sync mark detectors 416, 436 can comprise equalized sync mark patterns which have been convolved with an equalization target response.

Figure 5:
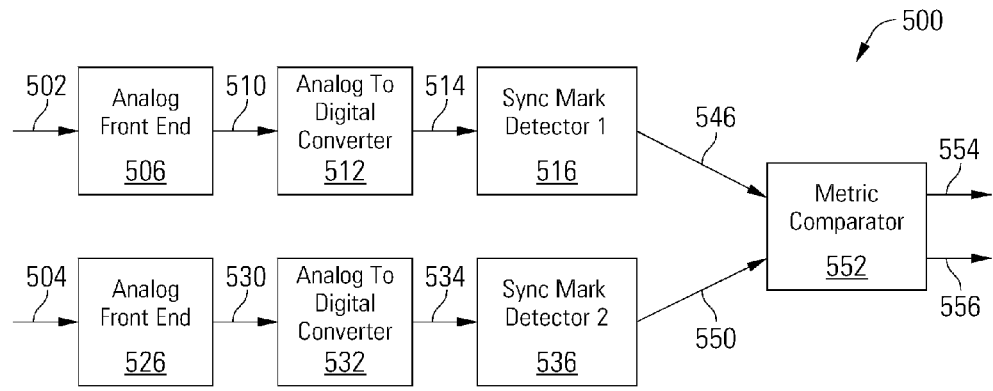
FIG. 5 depicts a data processing circuit with sync mark detectors for dual sync marks with metric outputs and with a sync mark detected comparator in accordance with some embodiments of the present invention.

Turning to FIG. 5, a data processing circuit 500 is shown in accordance with some embodiments of the present invention. A pair of analog signals 502, 504 receive analog signals read from a data track by dual read sensors. When the dual read sensors pass over a stored sync mark on the storage medium, the analog signals 502, 504 carry information representing the stored sync mark. When a stored sync mark is in the adjacent data tracks, the dual read sensors can also include information based on the sync mark in the adjacent data track. However, because orthogonal sync marks are stored in alternating data tracks, false detection of the sync marks in the adjacent data track(s) is prevented.

From the first read sensor, a first analog front end circuit 506 receives the analog signal 502 read from the data track. Analog front end circuit 506 processes analog signal 502 and provides a processed analog signal 510 to an analog to digital converter circuit 512. Analog front end circuit 512 can include, but is not limited to, a DC compensation circuit, an analog filter and an amplifier circuit as are known in the art. Based upon the disclosure provided herein, one of ordinary skill in the art will recognize a variety of circuitry that may be included as part of analog front end circuit 506. In some cases, analog input signal 502 is derived from a read/write head assembly (e.g., 220) that is disposed in relation to a storage medium (e.g., 216). Based upon the disclosure provided herein, one of ordinary skill in the art will recognize a variety of sources from which analog signal 502 may be derived.

Analog to digital converter circuit 512 converts processed analog signal 510 into a corresponding series of digital samples 514. Analog to digital converter circuit 512 can be any circuit known in the art that is capable of producing digital samples corresponding to an analog input signal. Based upon the disclosure provided herein, one of ordinary skill in the art will recognize a variety of analog to digital converter circuits that can be used in relation to different embodiments of the present invention.

Digital samples 514 are provided to a first sync mark detector 516. Sync mark detector 516 compares digital samples 514 as they are received with a first of the sync mark patterns. The algorithm applied by sync mark detector 516 to correlate the digital samples 514 with the first sync mark pattern can be any suitable correlation algorithm, such as, but not limited to, direct correlation, block correlation, norm-distance based approaches, etc. Based upon the disclosure provided herein, one of ordinary skill in the art will recognize a variety of correlation algorithms that could be used by sync mark detector 516 in relation to different embodiments of the present invention. In some embodiments, the sync mark detector 516 calculates the Euclidean distance between the digital samples 514 and the sync mark pattern and compares the Euclidean distance with a threshold. The sync mark detector 516 outputs a metric at output 546 representing the likelihood that the first sync pattern was detected. In some embodiments, the metric is the lowest Euclidean distance resulting from the sync pattern search. In some embodiments, the sync mark detector 516 outputs the metric only when it is below a threshold indicating that the first sync pattern has been detected. Again, the threshold can be set at a low value, such as a value smaller than half the Euclidean distance between the two sync mark patterns, in order to reduce the likelihood of erroneously detecting the second sync mark when the target data track contains the first sync mark but the read sensor producing analog input signal 502 picks up the second sync mark from an adjacent data track.

From the second read sensor, a second analog front end circuit 526 receives the analog signal 504 read from the data track. Analog front end circuit 526 processes analog signal 504 and provides a processed analog signal 530 to an analog to digital converter circuit 532. Analog front end circuit 532 can include, but is not limited to, a DC compensation circuit, an analog filter and an amplifier circuit as are known in the art. Based upon the disclosure provided herein, one of ordinary skill in the art will recognize a variety of circuitry that may be included as part of analog front end circuit 526. In some cases, analog input signal 504 is derived from a read/write head assembly (e.g., 220) that is disposed in relation to a storage medium (e.g., 216). Based upon the disclosure provided herein, one of ordinary skill in the art will recognize a variety of sources from which analog signal 504 may be derived.

Analog to digital converter circuit 532 converts processed analog signal 530 into a corresponding series of digital samples 534. Analog to digital converter circuit 532 can be any circuit known in the art that is capable of producing digital samples corresponding to an analog input signal. Based upon the disclosure provided herein, one of ordinary skill in the art will recognize a variety of analog to digital converter circuits that can be used in relation to different embodiments of the present invention.

Digital samples 534 are provided to a second sync mark detector 536. Sync mark detector 536 compares digital samples 534 as they are received with a second of the sync mark patterns. The algorithm applied by sync mark detector 536 to correlate the digital samples 534 with the second sync mark pattern can be any suitable correlation algorithm, such as, but not limited to, direct correlation, block correlation, norm-distance based approaches, etc. Based upon the disclosure provided herein, one of ordinary skill in the art will recognize a variety of correlation algorithms that could be used by sync mark detector 536 in relation to different embodiments of the present invention. In some embodiments, the sync mark detector 536 calculates the Euclidean distance between the digital samples 534 and the second sync mark pattern and compares the Euclidean distance with a threshold. The sync mark detector 536 outputs a metric at output 550 representing the likelihood that the second sync pattern was detected. In some embodiments, the metric is the lowest Euclidean distance resulting from the sync pattern search. In some embodiments, the sync mark detector 536 outputs the metric only when it is below a threshold indicating that the first sync pattern has been detected. Again, the threshold can be set at a low value, such as a value smaller than half the Euclidean distance between the two sync mark patterns, in order to reduce the likelihood of erroneously detecting the second sync mark when the target data track contains the second sync mark but the read sensor producing analog input signal 504 picks up the first sync mark from an adjacent data track.

Thus, depending on whether the first or second sync mark patterns are used in the target data track, either the first output 546 or the second output 550 should carry a lower metric. A sync mark detector metric comparator 552 compares the outputs 546, 550 to determine when a sync mark has been detected and to identify sync detection errors. When the metric at output 546 from the first sync mark detector 516 is less than the metric at output 550 from the second sync mark detector 536 (or when the second sync mark detector 536 outputs no metric), the metric comparator 552 asserts output 554 and does not assert output 556, indicating that the first sync mark pattern was detected. When the metric at output 550 from the second sync mark detector 536 is less than the metric at output 546 from the first sync mark detector 516 (or when the first sync mark detector 516 outputs no metric), the metric comparator 552 asserts output 556 and does not assert output 554, indicating that the second sync mark pattern was detected.

In some other embodiments, the sync mark detector metric comparator operates in a manner with features of both the comparators of FIG. 4 and FIG. 5, with the sync mark detectors outputting flags indicating when their sync mark patterns have been detected, along with a minimum metric, and the sync mark detector metric comparator comparing the two minimum metrics when both sync mark detectors indicate that their sync mark patterns have been detected. In these embodiments, the sync mark detector metric comparator operates as a tie breaker only when both detectors indicate that their sync mark pattern has been found, with the comparator identifying the sync mark pattern with the lowest metric as having been correctly detected.

Figure 6:
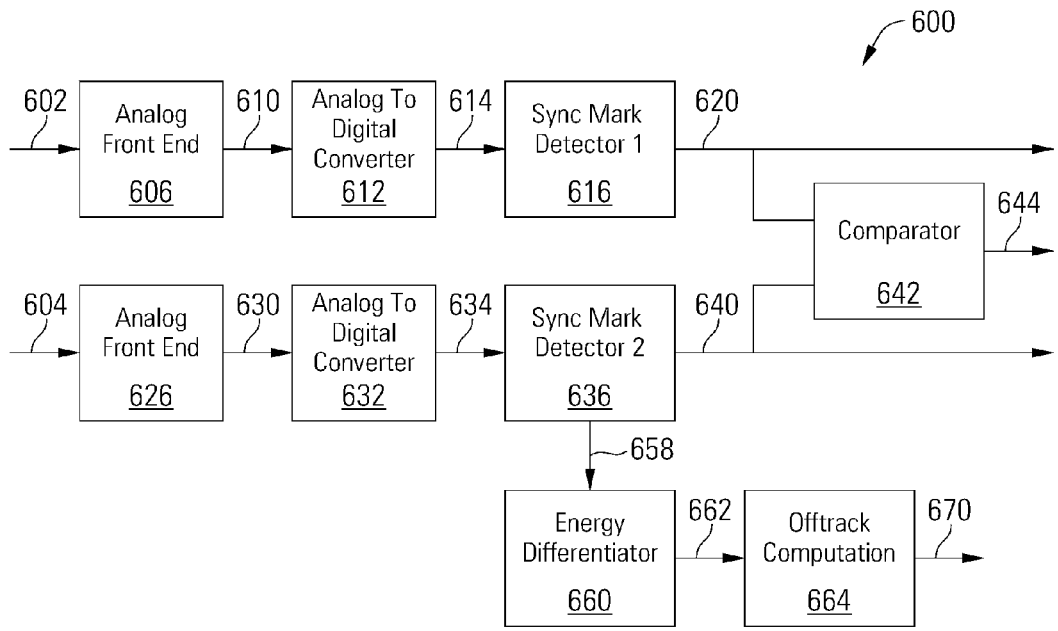
FIG. 6 depicts a data processing circuit with sync mark detectors for dual sync marks that detects offtrack position in accordance with some embodiments of the present invention.

Turning to FIG. 6, a data processing circuit 600 with sync mark detectors for dual sync marks is depicted that detects offtrack position in accordance with some embodiments of the present invention. In some embodiments, the offtrack position is measured as a percentage, based on the metrics calculated by sync mark detectors (e.g., 516, 536). Assuming the read back signal when reading a sync mark from the target track and when receiving adjacent track interference from a sync mark in an adjacent track is represented as:

$$x[n] = smTarg1 + \alpha \cdot smTarg2(k) + n \quad \text{(Eq 1)}$$

where smTarg1 is the ideal contribution to the read back signal from sync mark 1, where smTarg2(k) is the ideal contribution to the read back signal from sync mark 2 at a delay of k, and at an adjacent track interference level of $\alpha$, and where n is additive white Gaussian noise (AWGN).

For the target data track, the Euclidean distance can be calculated as:

$$SMDIST1[n] = \sum_{i=0}^{smLen} |x[n][i] - smTarg1[i]|^2 \quad \text{(Eq 2)}$$

$$= \sum_{i=0}^{smLen} |\alpha \cdot smTarg2[k] + n|^2$$

where smLen is the sync mark length.

For the adjacent track sync mark, the Euclidean distance can be calculated as:

$$SMDIST2[n] = \sum_{i=0}^{smLen} |x[n][i] - smTarg2[i]|^2 \quad \text{(Eq 3)}$$

Subtracting this Euclidean distance from the sync mark target energy for the adjacent track sync mark, the correlation of the adjacent data track sync mark with the data from the read sensors over the target data track can be calculated as:

$$\left( \sum_{i=0}^{smLen} |x[n][i]|^2 + \sum_{i=0}^{smLen} |smTarg2[i]|^2 - SMDIST2[n] \right) \Big/ 2 = \quad \text{(Eq 4)}$$

$$\text{corr}(smTarg2, [smTarg0 + \alpha \cdot smTarg2(k) + n]) =$$

$$[\alpha \cdot \delta(n-k) \sum_{i=0}^{smLen} |smTarg2[i]|^2 + \text{corr}(smTarg2, n)]$$

The expected value of this correlation is:

$$E\left[\sum_{i=0}^{smLen}|x[n-k][i]|^2 + \sum_{i=0}^{smLen}|smTarg2[i]|^2 - \frac{SMDIST2[n-k]}{2}\right] = \quad (Eq\ 5)$$

$$\alpha \cdot \sum_{i=0}^{smLen}|smTarg2[i]|^2$$

Thus the adjacent track interference level a, also used as and referred to as an offtrack position coefficient, can be estimated as:

$$\alpha = \frac{E\left[\sum_{i=0}^{smLen}|x[n-k][i]|^2 + \sum_{i=0}^{smLen}|smTarg2[i]|^2 - \frac{SMDIST2[n-k]}{2}\right]}{\sum_{i=0}^{smLen}|smTarg2[i]|^2} \quad (Eq\ 6)$$

In the data processing circuit 600, a pair of analog signals 602, 604 receive analog signals read from a data track by dual read sensors. From the first read sensor, a first analog front end circuit 606 receives the analog signal 602 read from the data track. Analog front end circuit 606 processes analog signal 602 and provides a processed analog signal 610 to an analog to digital converter circuit 612. Analog to digital converter circuit 612 converts processed analog signal 610 into a corresponding series of digital samples 614. Digital samples 614 are provided to a first sync mark detector 616. The sync mark detector 616 calculates the Euclidean distance between the digital samples 614 and the sync mark pattern and compares the Euclidean distance with a threshold, and if the Euclidean distance is less than a threshold, the sync mark detector 616 asserts a sync mark detected output 620, indicating that the first sync mark was detected. From the second read sensor, a second analog front end circuit 626 receives the analog signal 604 read from the data track. Analog front end circuit 626 processes analog signal 604 and provides a processed analog signal 630 to an analog to digital converter circuit 632. Analog to digital converter circuit 632 converts processed analog signal 630 into a corresponding series of digital samples 634. Digital samples 634 are provided to a second sync mark detector 636. The sync mark detector 636 calculates the Euclidean distance between the digital samples 634 and the second sync mark pattern and compares the Euclidean distance with a threshold, and if the Euclidean distance is less than a threshold, the sync mark detector 636 asserts a second sync mark detected output 640, indicating that the second sync mark was detected.

A sync mark detector output comparator 642 analyzes the first sync mark detected output 620 and the second sync mark detected output 640 to identify sync detection errors, producing an output 644 that indicates whether detection errors occurred.

An energy differentiator 660 receives the metric 658 or Euclidean distance from sync mark detector 636, representing the Euclidean distance between the digital samples 634 and the second sync mark pattern in an adjacent track as in Equation 3, assuming for simplicity that the second sync mark pattern is the sync mark written to the adjacent track. The energy differentiator 660 subtracts the metric 658 from the sync mark target energy, resulting in a correlation 662 as in Equation 4. The expected value of this correlation 662 is given in Equation 5. An offtrack computation circuit 664 computes the offtrack position coefficient α 670 as in Equation 6. The energy differentiator 660 and offtrack computation circuit 664 can be any suitable circuits for performing the calculations of Equations 4 and 6, either exactly or as an estimate. Based upon the disclosure provided herein, one of ordinary skill in the art will recognize a variety of circuitry that may be included in energy differentiator 660 and offtrack computation circuit 664.

In some embodiments, the dual sync mark system (e.g., 400, 500) disclosed herein is used to identify sector format, for example when both shorter and longer sectors are written to a storage medium. In these embodiments, a first sync mark pattern is used with the shorter sectors and a second sync mark pattern is used with the longer sectors, where the first and second sync mark patterns are orthogonal or substantially orthogonal. When the first sync mark pattern is detected, a read channel that processes data from the storage medium is configured to process the shorter sector format, for example configuring a Viterbi data detector and low density parity check decoder to process the shorter data sector length. When the second sync mark pattern is detected, the read channel that processes data from the storage medium is configured to process the longer sector format, for example configuring the Viterbi data detector and low density parity check decoder to process the longer data sector length. The sector format detection can be performed by the comparator (e.g., 442, 552).

In some embodiments, the dual sync mark system (e.g., 400, 500) disclosed herein is used to determine when data polarity is reversed. In the read channel circuit, if the polarity of the read back signal can be inverted, the dual sync mark system can be used to determine when the data polarity is reversed, enabling the Viterbi data detector to be configured to process inverted data or otherwise inverting and correcting the data. In these embodiments, one sync mark pattern is used in all data tracks on the storage medium. One of the sync mark detectors (e.g., 416) is configured to detect the sync mark pattern as written to the storage medium. The other of the sync mark detectors (e.g., 436) is configured to detect a bitwise inverse of the sync mark pattern. Thus, the sync mark can be detected even if the polarity of the data is inverted in the read back signal, and the inverse polarity condition can be accommodated in the read channel, for example by inverting the polarity of digital samples to correct the data. The data polarity detection can be performed by the comparator (e.g., 442, 552).

In some embodiments, the dual sync mark system (e.g., 400, 500) disclosed herein is used to distinguish user data on the storage medium from flawscan fragments left on the storage medium during manufacturing flawscan tests. In these embodiments, a first sync mark pattern is used when writing data for flawscan tests, and a second sync mark pattern is used when writing user data. When the first sync mark pattern associated with flawscan tests is detected, the read channel can be disabled or powered down, saving power when the read head is not reading user data. More than one of these applications can be performed simultaneously by increasing the number of sync mark patterns and sync mark detectors. The flawscan fragment detection can be performed by the comparator (e.g., 442, 552).

Figure 7:
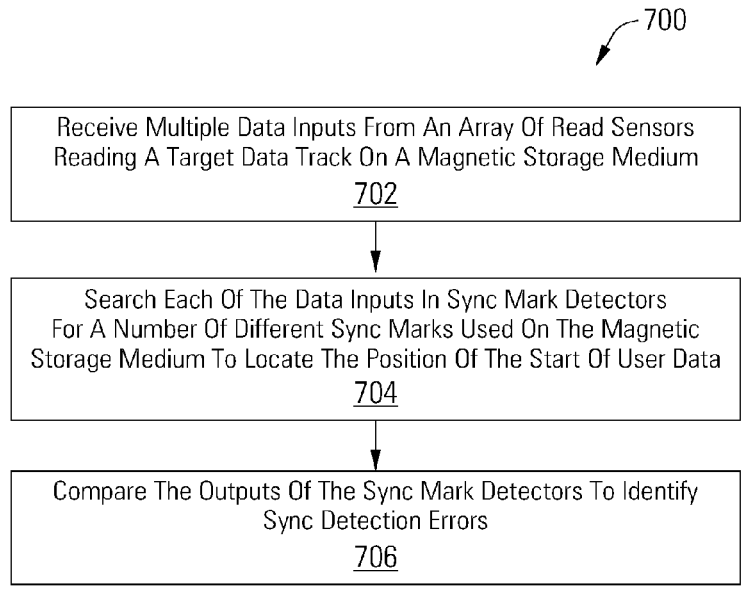
FIG. 7 is a flow diagram showing a method for locating the position of the start of user data in each sector in each track in accordance with some embodiments of the present invention.

Turning to FIG. 7, a flow diagram 700 shows a method for locating the position of the start of user data in a data track and for detecting sync mark detection errors in accordance with some embodiments of the present invention. Following flow diagram 700, multiple data inputs are received from an array of read sensors reading a target data track on a magnetic storage medium. (Block 702) Sync mark detectors search each of the data inputs for a number of different sync marks used on the magnetic storage medium to locate the position of the start of user data. (Block 704) The outputs of the sync mark detectors are compared to identify sync detection errors.

(Block 706) In some embodiments, this flags an error when more than one sync mark detector indicates that it has detected a sync mark, because the read sensors cannot correctly detect two different sync patterns in the same target data track. In some embodiments, this compares the detection metric from multiple sync mark detectors when they detect multiple sync mark patterns, determining which of the sync mark patterns was most strongly detected.

It should be noted that the various blocks shown in the drawings and discussed herein may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel sync mark systems and methods for two dimensional magnetic recording and other applications. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system comprising:
   a plurality of analog to digital converters operable to sample analog signals obtained from a magnetic storage medium to yield digital signals;
   a plurality of sync mark detectors operable to search for a plurality of different sync marks in the digital signals; and
   a sync mark detector output comparator operable to compare an output of each of the plurality of sync mark detectors to identify detection errors.

2. The data processing system of claim 1, wherein different ones of the plurality of different sync marks are written on adjacent tracks on the magnetic storage medium.

3. The data processing system of claim 2, wherein each of the plurality of different sync marks is orthogonal to others of the plurality of different sync marks.

4. The data processing system of claim 1, further comprising an array of read sensors adapted to read a single data track together to generate the analog signals.

5. The data processing system of claim 1, wherein the sync mark detector output comparator is operable to indicate a detection error when more than one of the plurality of sync mark detectors indicates that it has detected one of the plurality of different sync marks.

6. The data processing system of claim 1, wherein the plurality of sync mark detectors are each operable to receive one of the digital signals and to calculate a metric representing a difference between said one of the digital signals and one of the plurality of different sync marks.

7. The data processing system of claim 6, wherein the sync mark detector output comparator is operable to compare each of the metrics that are below a threshold and to indicate as detected one of the plurality of different sync marks associated with a lowest of the metrics that are below the threshold.

8. The data processing system of claim 1, further comprising an offtrack computation circuit operable to calculate an offtrack position coefficient based on an output of at least one of the plurality of sync mark detectors.

9. The data processing system of claim 1, wherein the sync mark detector output comparator is operable to detect a sector format based on which of the plurality of different sync marks is detected by the plurality of sync mark detectors.

10. The data processing system of claim 1, wherein the sync mark detector output comparator is operable to detect a polarity of the digital signals based on an output of at least one of the plurality of sync mark detectors.

11. The data processing system of claim 1, wherein the sync mark detector output comparator is operable to distinguish between user data and flawscan fragments on the magnetic storage medium based on which of the plurality of different sync marks is detected by the plurality of sync mark detectors.

12. The data processing system of claim 1, wherein the system is implemented as an integrated circuit.

13. The data processing system of claim 1, wherein the circuit is incorporated in a storage device.

14. A method for detecting a location of user data on a recording medium, comprising:
   receiving a plurality of data inputs from an array of read sensors for a data track on the recording medium;
   searching each of the plurality of data inputs for a different one of a plurality of different sync marks to detect a location of user data on the recording medium to yield detection results; and
   comparing the detection results to determine which of the plurality of different sync marks was correctly detected.

15. The method of claim 14, wherein each of a plurality of data tracks on the recording medium contains a different one of the plurality of different sync marks than adjacent ones of the plurality of data tracks.

16. The method of claim 14, further comprising indicating a sync mark detection error when more than one of the plurality of different sync marks is detected.

17. The method of claim 14, wherein comparing the detection results comprises comparing a plurality of detection metrics for more than one of the plurality of different sync marks and identifying a lowest of the plurality of detection metrics.

18. The method of claim 14, further comprising calculating an offtrack position coefficient based on the detection results.

19. The method of claim 14, further comprising identifying a sector format based on the detection results.

20. A storage device, comprising:
   a plurality of analog to digital converters operable to sample analog signals obtained from a magnetic storage medium to yield digital signals;
   a plurality of sync mark detectors each operable to receive one of the digital signals and to calculate a metric representing a difference between said one of the digital signals and one of a plurality of different sync marks;
   a sync mark detector output comparator operable to identify one of the plurality of different sync marks as detected when an associated one of the metrics has a lowest metric value and is below a threshold;
   a correlator circuit operable to calculate a correlation of one of the plurality of different sync marks from an adjacent data track with the digital signal from a target data track based on an output of at least one of the plurality of sync mark detectors; and
   an offtrack computation circuit operable to calculate an offtrack position coefficient based at least in part on the correlation.

* * * * *